(No Model.)
F. KRAENGEL.
Nail Extractor.
No. 231,332. Patented Aug. 17, 1880.
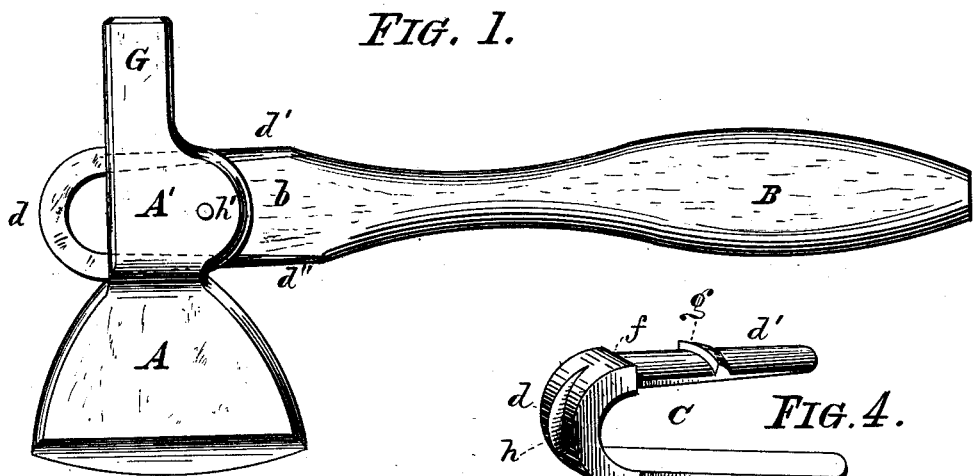
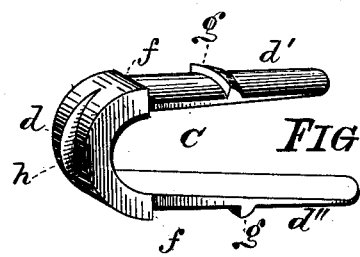
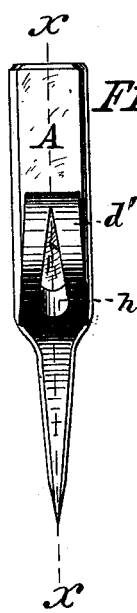
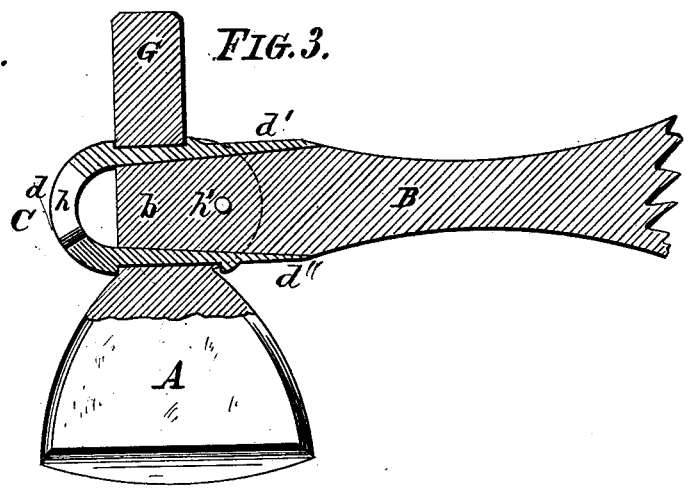
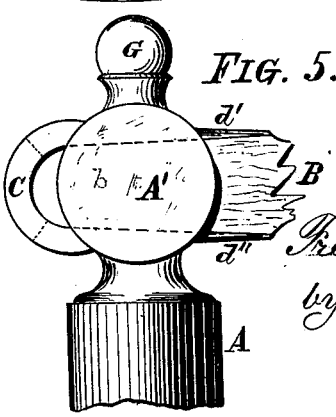
Witnesses:
Michael J. Stark,
Frank Hirsch.
Inventor:
Frederic Kraengel,
by Michael J. Stark,
Attorney.

UNITED STATES PATENT OFFICE.

FREDERIC KRAENGEL, OF BUFFALO, N. Y., ASSIGNOR OF ONE-HALF OF HIS RIGHT TO EMIL JETTER AND ALBERT JETTER, OF SAME PLACE.

NAIL-EXTRACTOR.

SPECIFICATION forming part of Letters Patent No. 231,332, dated August 17, 1880.

Application filed May 21, 1880. (No model.)

*To all whom it may concern:*

Be it known that I, FREDERIC KRAENGEL, of Buffalo, in the county of Erie and State of New York, have invented certain new and useful Improvements on Nail-Extractors; and I do hereby declare that the following description of my said invention, taken in connection with the accompanying sheet of drawings, forms a full, clear, and exact specification, which will enable others skilled in the art to which it appertains to make and use the same.

This invention has general reference to handled tools, such as axes, hatchets, hammers, &c.; and it consists in the novel and peculiar handle-holder, as hereinafter first fully set forth and described, and then pointed out in the claims.

In the drawings already referred to, Figure 1 is an elevation of a hatchet provided with my improved nail-extractor. Fig. 2 is an end view of the same. Fig. 3 is a longitudinal sectional elevation in line $x\,x$ of Fig. 2. Fig. 4 is a perspective view of the holder detached, and Fig. 5 is an elevation of a hand-hammer provided with my improved handle-holder.

Like parts are designated by corresponding letters of reference in all the figures.

A in these drawings represents a hatchet, hammer, or similar tool having a wooden handle, B, passed centrally through the eye A'.

C is my improved holder. It consists of a U-shaped piece having a curved or semicircular head, $d$, and two tines, $d'\,d''$, as shown in detail in Fig. 4. These tines join the head in such manner as to leave shoulders $f$ resting against the front part of the cheeks, and they are provided with projections $g$, if desired, resting against the back part of said cheeks.

In the head $d$ there is a tapering slotted aperture, $h$, serving as claws to extract nails, in a manner as hereinafter more fully described.

The handle B has a tapering head, $b$, fitting the space between the tines $d\,d'$ of the holder, while the external distance between said tines fits the eye in the tool.

To tightly hold the hatchet, hammer, &c., to the handle, the holder C is first inserted into the eye of said tool, and the handle then forced between the tines into the eye of the tool; after which a pin, $h'$, may be passed through the cheeks E and through said handle, to prevent the latter from withdrawing.

A handle inserted into the tool and held therein by the holder described will be so tightly wedged in position as to preclude the possibility of its ever getting loose.

The device is therefore particularly adapted to hatchets, hand-hammers, &c., and it has the special advantage that the tool can be used as a nail-extractor in the following manner: The head of the nail to be pulled is forced into the slotted tapering aperture $h$ in the curved head $d$, and the handle B then depressed, in which case the head G of the tool serves as a fulcrum, so that the nail can be readily pulled.

The holder C may be cast or produced by the well-known methods of drop-forging, and it can be so cheaply made as to advance but a trifle the cost of a tool to which it is applied.

Having thus fully described my invention, I claim as new and desire to secure to me by Letters Patent of the United States—

1. As a new and improved article of manufacture, the nail-extractor hereinbefore described, consisting of a U-shaped piece, C, having a tapering slot-hole, $h$, in its curved part $d$, shoulders $f$, and tines $d\,d'$, substantially as described, said U-shaped piece being adapted for use on a handled tool, substantially in the manner as and for the object stated.

2. The improved nail-extractor hereinbefore described, consisting of a U-shaped piece, C, having the shoulders $f$ on the head $d$ and the shoulders $g$ on the tines $d\,d'$, said U-shaped piece being adapted for insertion into the eye of a tool, A, substantially as specified, with its head $d$ projecting from the front edge of said tool, as and for the object stated.

3. An improved nail-extractor, consisting of a U-shaped piece, C, having a curved head, $d$, provided with a tapering slotted aperture, $h$, and shoulders $f$, and the tines $d'\,d''$, provided with shoulders $g$, substantially in the manner as and for the object specified.

In testimony that I claim the foregoing as my invention I have hereto set my hand in the presence of two subscribing witnesses.

F. KRAENGEL.

Attest:
MICHAEL J. STARK,
FRANK HIRSCH.